3,093,603
LATEX PAINT PIGMENT AND PROCESS
Allan E. Gilchrist, Fairview Park, Ohio, assignor to The Glidden Company, Cleveland, Ohio, a corporation of Ohio
No Drawing. Filed Nov. 23, 1960, Ser. No. 71,147
10 Claims. (Cl. 260—17)

This invention relates to an improved paint pigment for blending with aqueous compounded film-forming latex and water to form an aqueous latex paint, and to a process for making such paint.

A good aqueous latex paint should air-dry at room temperature and down to temperatures as low as about 50° F. The paint should be easy to apply to the work, give a non-streaked impression of color (which is a function of how well the vehicle maintains the paint dispersion and how effectively the paint components are adequately dispersed). When applied to the work the paint should have a hold-open time of a few minutes under ordinary conditions, that is, the time the film stays wet so that the joints can be successively lapped over as painting progresses without leaving significant lap marks. While the paint should, of course, adhere to the work, it should leave a discernible unitary film and not disappear by penetration into the work; this property is called holdout. The viscosity of the mixed paint should be such that it does not readily run or drip off a brush or roller, nor "spit" or foam under the roller when being applied. The film should not be lumpy and should have uniformly-dispersed or distributed pigment. Viscosity and holdout can be obtained physically by the incorporation of a small amount of bodying agent into the paint, one of the most effective being hydroxy ethyl cellulose in a proportion broadly between 0.1 and 5%, and preferably between 0.8 and 2% based on the weight of the pigmentary material in the paint.

The instant invention concerns the intimate, uniform, and effective dispersion, with low power input, of pigmentary material into water and into aqueous latex systems for the preparation of aqueous latex paint bodied with hydroxy ethyl cellulose. This invention makes hand preparation of such paints from the pigmentary material, aqueous latex, and water easy and therefore practical for general use to obtain consistently high quality aqueous latex emulsion paint. The key to the invention is the use of pigmentary material conjointly with a bodying agent of hydroxy ethyl cellulose that has the critical level-out time of at least about 20 seconds and advantageously not substantially in excess of about 30 minutes.

Accordingly, one aspect of my invention concerns pigmentary material compounded with such hydroxy ethyl cellulose so as to comprise the paint pigment. Another aspect of my invention is an improvement in process for making aqueous latex paint from water-insoluble pigmentary material and aqueous compounded film-forming latex which comprises employing as the bodying agent 0.1 to 5 weight percent, based on the weight of the pigmentary material, of such hydroxy ethyl cellulose.

The level-out time of particular hydroxy ethyl cellulose can be controlled by heating it to make it increase. Thus, for example, I can spread 25 grams of hydroxy ethyl cellulose particles in a pan surface of 36 sq. inches, said hydroxy ethyl cellulose having zero level-out time, and increase its level-out time by baking the granules in a 300° F. oven for 20 minutes, thereby raising the level-out time to 20–50 seconds. Further oven time at this temperature causes the level-out time to increase rapidly and to reach infinity at 25 minutes of baking.

The level-out time of a particular hydroxy ethyl cellulose can be measured as follows: 500 ml. of water at 70° F. is agitated in an unbaffled quart container about 4¼" diameter with a 1¾" diameter driven propeller which is immersed about 2" deep in the water at rest. The speed of the propeller should be sufficient to obtain a vortex of about 1½" deep but the propeller speed should not be so great as to make a substantially deeper vortex and beat in air by exposure of the propeller. Adequate propeller speed is approximately 100 r.p.m. To the agitated water there is added 15 grams of hydroxy ethyl cellulose particles passing a 40 mesh (U.S.S.) sieve. The time from the addition of the hydroxy ethyl cellulose until the time when the vortex virtually disappears and the surface of the solution levels out is the "level-out" time. If any substantial foam formation is encountered, and it interferes with the visual observation of the level-out process, a minute amount of pine oil can be added to the mixture, e.g., less than ½ cc., to reduce foam.

Alternatively, the level-out time can be measured on a Brabender recording viscosimeter, Type 2A, operating at 200 r.p.m. with a single flag paddle. The level-out time in this case is approximately double the time it takes between the addition of the hydroxy ethyl cellulose to the water and the time when inflection in the viscosity curve is observed. In this measurement the viscosity curve as plotted by the machine rises slowly from about 30 Brabender units during the level-out time to 150–250 Brabender units, then rises sharply in viscosity thereafter.

The level-out time is a measure of how long the paint ingredients will be easily dispersible at low viscosity before substantial bodying is exerted and the mixing becomes substantially less effective. Where hand mixing of the paint ingredients is to be practiced at least about 20 seconds' level-out time is necessary for effective and virtually uniform dispersion of the pigmentary material into water to produce, at the low power available, an aqueous latex emulsion paint that is fairly certain of being non-streaked in appearance and free from lumps and unwetted pigment particles. Preferably this level-out time is at least about 1 minute for even greater insurance of adequate dispersion of the pigment. If the time is substantially longer than about 30 minutes before the development of viscosity approaching the ultimate, the mixing can be impractically long and the resulting paint will not be ready for use in its best condition until that time without re-mixing.

The pigment of this invention is especially adapted for use in the instant latex paint concentrates described and claimed in my copending U.S. patent applications S.N. 50,087, filed on August 17, 1960, and 57,900, filed on September 23, 1960. In the preparation of the latex paints from the concentrate described in S.N. 50,087, the pigment base unit customarily is dispersed in a predetermined quantity of water, then the aqueous compounded film-forming latex is added thereto and blended in. The disclosures of the aforesaid two copending applications are incorporated herein by reference particularly as to pigmentary material, extenders, latices, and dispersing assistants.

The mineral pigmentary material suitable for incorporation into the instant pigment includes pigmentary-size white opacifying agents such as rutile or anatase titania, lithopone, titanium calcium, white lead, zinc oxide, leaded zinc oxide, and mixtures of same; extenders such as clay and particularly the kaolinite clay described and claimed in S.N. 57,900 having average particle size between about 6 and 12 microns, the preponderance of individual particles being not substantially larger than about 50 microns and the larger portion of the particles being characteristically in the form of stacks of plate-like structures, pigmentary silica, talc, mica, Wollastonite, calcium carbonate, and barium sulfate. While many other pigmentary materials and extenders can be included in my pigment, e.g., fuller's earth, diatomaceous silica, etc., I have found that these latter two have poor water absorption characteristics, and therefore I prefer to avoid them because their use tends to give a latex paint which preserves brush marks.

Additional pigmentary materials that I can use impart color to the pigment. For example, ferrite yellow oxide, ferric oxide, "brown" iron oxide (which is a blend of red, yellow and black iron oxides), tan oxide of iron (which is a similar blend), raw sienna and burnt sienna, raw and burnt umber, chromium oxide green, phthalocyanine green (chlorinated copper phthalonitrile), the green iron salt of nitroso beta naphthol, copper phthalonitrile blue, ultramarine blue, carbon black, lamp black, toluidine red, parachlor red, para toner (red), alkali resistant red, BON red and maroon, cadmium reds and yellows, Watchung red, madder lake (red), Duratone red, carmine red, chrome yellow (lead chromate), chrome orange, Hansa yellows (which are azo couplings of meta-nitroparatoluidine and acetoacetanilide), and golden nickel azo complexes such as those shown in U.S. Patent 2,396,327.

The pigment of my invention can also comprise various specially treated materials such as a pigmented resin, nacreous graphite, or specialty pigments such as those shown in the following patents: 2,539,429; 2,613,158; 2,613,159; 2,637,711; 2,722,485; 2,749,248; 2,780,612; 2,875,076; and 2,932,580. Additionally, the pigment of my invention can include suitable metallescent, intumescent, and otherwise storage-sensitizing ingredients which act on aqueous latex. Typical intumescent materials include: ammonium sulfate, borax, antimony trichloride, mono- and diammonium phosphates, guanylurea phosphate, ureaformaldehyde resins, etc. Metal flakes, powders and pastes as a component of the pigment can include elemental aluminum, bronze, iron, copper, tin, molybdenum, cobalt and nickel, and there can also be incorporated latex curing accelerators such as salts of cobalt or manganese.

Additionally, the pigment can contain dispersing assistants such as sodium hexametaphosphate, tetrasodium pyrophosphate and trisodium phosphate, pine oil, tributyl phosphate, lecithin, synthetic detergent such as dodecyl benzene, sodium sulfate, and the like. Advantageously, I use between about 0.01 and 0.3% and preferably from 0.05–0.2% of sodium hexametaphosphate as a dispersing assistant in the pigment except when using metallic aluminum in the pigment (which disperses adequately without such assistant and actually reacts with the alkaline materials to its detriment).

Other materials which I can incorporate into my pigment include preservatives and pesticides for protection of the paint against microbial or fungus attack, e.g., phenyl mercury compounds (acetate, propionate, oleate, etc.), phenolic pesticides such as orthophenylphenol and its sodium salt, chlorinated phenols, mixtures of same and the like.

In this connection I have found that selection of a pesticide is very important in obtaining the most uniform paint film. Thus, using about 0.05–2%, and preferably about 0.1–0.5% for efficiency and economy, of a pesticide having pH in saturated aqueous solution not substantially above 9 does not interfere with the hydroxy ethyl cellulose and shorten its apparent level-out time, whereas the more highly alkaline pesticides, e.g., technical sodium orthophenylphenate and the sodium salt of 2,4,5-trichlorophenylphenol containing free caustic soda, will substantially reduce or even can destroy any level-out time that the hydroxy ethyl cellulose thickener has, and therefore substantially interfere with the efficient mixing of the pigmentary solids with water at low power input.

The preferred water dispersible pesticides are phenolic ones for efficiency and economy, and, if they are not water soluble or are very difficult to disperse in water, they can be introduced into the pigment after having been dissolved in a small amount of organic material such as the pine oil dispersing assistant, tributyl phosphate, linseed oil, sulfonated castor oil, a high molecular weight glycol or ether glycol, or the like. Specific phenolic pesticides include orthophenylphenol, polyhalogenated phenols, and halogenated phenylphenol, and more specifically, 2,4,5-trichlorophenol; 2,4,6-chlorophenol; chloro-2-phenylphenol; 2-chloro-4-phenylphenol; 2 bromo-isophenylphenol; 2,3,4,6-tetrachlorophenol; and pentachlorophenol.

Other suitable pesticides include zinc dimethyl dithiocarbamate, tetramethylthiuram disulfide, the lower alkyl or benzyl esters of parahydroxybenzoic acid, phenylmercurymonoethanolammonium acetate, sodium paratoluenesulfonchloramide, N - trichloromethyl thiotetrahydrophthalimide, and benzene hexachloride and its gamma isomer. Some of these are readily water dispersible and can be used without an organic dispersing assistant, and others require dissolving in pine oil or the like for most effective dispersion. Of course mixtures of the foregoing pesticides can be used, and even small portions of the highly alkaline ones can be employed, suitably in conjunction with the less alkaline ones, to give an overall pesticidal effect if the amount of the highly alkaline ones is small enough to exert negligible alkaline effect on the paint mixture.

The pigment preferably is in the form of a powder ostensibly dry to the touch although it is recognized that various pigmentary ingredients can have a small measure of free or bound water in their constitution. Alternatively the pigment can be in the form of one or more compressed water-disintegrable pellets or bricks. Alternatively, also, the pigment can be in the form of a packaged paste or other dispersion suitable for blending with water and aqueous compounded film-forming latex.

The most suitable grade of hydroxy ethyl cellulose for incorporation into my pigment is a highly viscous one, that is, one having at least about 100 centipoises viscosity (measured at 20° C. in 2% aqueous solution), advantageously 200–25,000 centipoises, and preferably between about 3500 and 6500 centipoises. The use of hydroxy ethyl cellulose exhibiting higher viscosity than 25,000 centipoises can make the blending of the ingredients for the latex paint somewhat difficult but not impossible. However, the use of hydroxy ethyl cellulose of substantially lower viscosity than about 100 centipoises in the pigment base should be avoided so that small enough proportions can be effective for bodying the paint without imparting poor water resistance to it.

An important consideration for effective and simple dispersibility is that the hydroxy ethyl cellulose be quite small in particle size, that is, "equivalent spherical diameter," when incorporated into the pigment in the preferred solid state. Accordingly, the particle size of the hydroxy ethyl cellulose is preferably not substantially above about 150 microns and it is actually milled with the mineral pigment particles. The milling of the hydroxy ethyl cellulose with the mineral pigment helps in eliminating lumpiness in the resulting paint when the paint is made up with simple hand stirring as would be done in the ordinary domestic situation. Grinding the hydroxy ethyl cellulose with the mineral pigment or applying it to the pigment in aqueous colloidal dispersion or in water solution are effective techniques here.

Thus, from the foregoing, the essential ingredients of my pigment are a mineral pigmentary material, e.g., a pigmentary size opacifying white, extenders such as clay, or mica, etc. and/or an elemental metal such as aluminum powder in conjunction with the particular hydroxy ethyl cellulose for making up the aqueous latex paint therewith. There is, of course, a host of film-forming latices available. Broadly the most suitable latices have small particle size for fusing and becoming film-forming and for exhibiting good pigment binding qualities, e.g., averaging about 0.5 micron or smaller with the average vinyl acetate resin particle size being permissively somewhat greater than most of the others, that is, up to about 0.5–5 microns.

The suitable latices can render the resulting paint adequate for virtually any sort of application, that is, outdoor application as well as indoor finishing or even baking. Ordinarily these latices are made by emulsion polymerization and suitable emulsions include those of vinyl resins by which I mean to include vinyl acetate, vinyl chloride, vinylidene chloride, and the like; those of hydrocarbon polymers and copolymers, polyethylene, polypropylene and oxygenated or halogenated derivatives of same by which I mean to include polybutadiene, oxygenated polybutadiene, polyisoprene, oxygenated polyisoprene, butadiene-styrene, butadiene-vinyl toluene, isoprene-styrene and the like; acrylic latices by which I mean to include polymers and copolymers containing units of acrylic acid, methacrylic acid, their esters, and acrylonitrile; alkyds; reaction products of vinylic hydrocarbon monomers with unsaturated materials such as the reaction product of maleic acid with styrene; and, broadly, the various other resinous and rubber-like elastomeric products which are obtainable in stable aqueous latex form and are capable of coalescing into a pigmented film when brushed, sprayed, or rolled onto a surface at ordinary room conditions, i.e., 75° F., 25% relative humidity, and one atmosphere total pressure.

As is well known in the art the suitable stable aqueous latices are ordinarily made by emulsion polymerization, and usually they must not be compounded with certain water-soluble solvents such as lower alkanols, 2-ethoxy-ethanol-1, dioxane, and the like, elemental copper, flake or pulverized aluminum or conventional pastes thereof, most intumescent salts, most multivalent ions, alkali such as caustic soda in the case of vinyl acetate resins, borax, and a host of other metal compounds, particularly salts which render the latex unstable or unsafe.

The compounded latex will tolerate, however, water, hydrophilic protective colloids such as water soluble hydroxy ethyl cellulose, carboxymethyl cellulose, sodium caseinate, natural gums such as gum tragecanth, locust bean gum, caraya gum, guar gum, Irish moss gum, and alkali metal alginates; small amounts of low boiling hydrocarbon solvents such as $C_{6-9}$ aliphatics (generally referred to as naphthas) for reduction of foaming, various surfactants, e.g., anionics such as sodium dodecyl benzene sulfate and sodium dodecyl benzene sulfonate, nonionics such as iso-octyl phenoxy polyethoxy ethanol, cationics such as dimethylsteramidopropyl - 2 - hydroxy ethyl ammonium dihydrogen sulfate, ampholytics such as coconut fatty acid amide condensates, etc., freeze-thaw recovery agents such as the lower alkylene glycols, alkali-fast colorants such as Hansa yellow dyes, phthalocyanine blues and greens, red or yellow oxide or iron toners, and toluidene reds.

Ordinarily, the latices are supplied from the manufacturer with some or all of these ingredients, and also can have in them a fungicide, a thickener-stabilizer such as methylcellulose thickener, a starch phosphate, and a dispersant such as pine oil or low molecular weight lignin sulfonates, e.g., those suitably between 10,000 and 40,000 M.W., various surfactants, e.g., nonionic agents such as iso-octyl or nonyl phenoxy polyethoxy ethanol wherein the number of equivalent ethylene oxide units in the molecule averages between 9 and 10 per mol of alkylated phenol, dioctyl sulfosuccinate, and anionic soaps such as sodium dodecyl benzene sulfonate.

The following examples show ways in which my invention has been practiced but should not be construed as limiting the invention. The particular paints were mixed in open vessels for brushing therefrom and, in most cases, could be thinned for spraying. All percentages, parts, ratios and fractions in this application are by weight unless otherwise expressly indicated.

*Example 1*

An aqueous latex was made by emulsion polymerization of vinyl acetate monomer and 2-ethyl hexyl acrylate monomer by feeding these monomers into the balance of the mixture which was agitated and heated to 140° F. to initiate the reaction. The kettle used was equipped with a distilling column maintained at total reflux. The reaction period was 14–16 hours. The proportions of reaction mixture were as follows:

| | Lbs. |
|---|---|
| Deionized water | 100.00 |
| Sodium bicarbonate | 0.47 |
| Sodium dodecylbenzene sulfonate | 1.51 |
| Nonionic surfactant [1] | 3.67 |
| Hydroxy ethyl cellulose having in 2% water solution at 20° C. a viscosity of 8–12 cups | 1.00 |
| Potassium persulfate | 0.23 |
| 2-ethyl hexyl acrylate monomer | 18.00 |
| Vinyl acetate monomer [2] | 82.00 |

[1] A blend of 1.51 lbs. of iso-octyl phenoxy polyethoxy ethanol containing 9 to 10 ethylene oxide units per mol of the alkyl phenol and 2.16 lbs. of a similar compound except that it contained about double the mols of ethylene oxide units per mol of the alkyl phenol.
[2] Stabilized with 0.002% of hydroquinone A 725-gram portion of the resulting aqueous latex, containing about 50% latex solids, was further compounded with 5 grams of pine oil, and this compounded material was maintained in a discrete package.

A pigment base was made of the following listed components by pre-mixing them in a hammer mill in the following proportions:

| | Grams |
|---|---|
| Classified kaolinite clay having particle size range between 1.4 and 20 microns and averaging 9.5 microns, the conformation of which was stacks of plate-like structures. Virtually no particles were smaller than 2 microns | 625 |
| Talc (calcium silicate) having an average particle size of 7 microns and a size range between 1.55 and 28 microns, needle-like particles | 375 |
| White muscovite mica having average particle size of 10–11 microns | 200 |
| Hydroxy [1] ethyl cellulose of particle size 100 mesh (U.S.S.) and finer having 98.5% water solubility, viscosity in 2% aqueous solution of 3500–5000 centipoises at 20° C., and level-out time of 15 minutes | 25 |
| Rutile pigmentary titania | 525 |
| Sodium hexametaphosphate powder | 1.5 |
| 5 grams of orthophenylphenol dissolved in 5 grams of pine oil (white) | 10 |

[1] Having pH at 25° C. in 2% aqueous solution of 6–8, maximum ash content of 6%, and maximum water content of 5%.

This pigment was packaged, the package unit of 1761.5 grams emptied into a mixing container containing 2465 grams of water, and the whole stirred by hand with a paddle for about 5 minutes. The pigment was readily dispersed without excessive development of viscosity. Then the 730-gram package of aqueous compounded latex was emptied into the resulting aqueous pigment slurry. The stirring was continued for about 2 minutes, then the mixture allowed to stand for about 15 minutes whereby a gallon of aqueous latex emulsion paint was made.

After about 15 minutes of standing, the paint was brushed out on a test board. It demonstrated an excellent ease of application, non-streaking, a hold-open time of about 5 minutes, and a viscosity of about 80 Krebs units (equivalent to about 500 Brabender units, single flag paddle at 200 r.p.m.) which prevented the paint from dripping or running off the brush. The exceedingly few lumps which were initially apparent easily brushed out with ordinary brushing. The paint air-dried to give a superior scrub resistance after about 15 minutes of drying, allowing easy removal of pencil marks when stroked with a wet, soapy rag without destroying the film.

*Example 2*

When paint exactly like that of Example 1, except that it contained hydroxy ethyl cellulose of zero level-out time instead of 15 minutes, was made up and applied in the same way, the resulting film exhibited far less hiding power than the paint film of Example 1 because of poorer distribution of the titania and because roughly 10% of the pigment appeared to be present in the film as minute lumps approaching about 1/64" in diameter, the majority of which took vigorous brushing to break up. The paint film of Example 1, on the contrary, showed very few lumps with ordinary brush-out effort, and was of decidedly superior appearance and quality.

In another preparation where the formulation was exactly like that of Example 1, except that 5 grams of technical grade of the sodium salt of orthophenylphenol containing some free caustic soda was employed instead of 5 grams of orthophenylphenol dissolved in pine oil, the paint mixture thickened prematurely in spite of the hydroxy ethyl cellulose having about 15 minutes level-out time and the hand mixing was substantially less effective for uniformly dispersing the pigmentary material into the paint product. The pH of a saturated aqueous solution of this sodium orthophenylphenate at 25° C. is about 11.4. The paint film from this test was considerably more lumpy than the paint film described in Example 1.

*Example 3*

A package of white aqueous compounded latex like that of Example 1 was tinted blue with 2 oz. of a 10% dispersion of copper phthalocyanine toner, the suspending agent for the pigment in this toner being 67% 2-ethoxyethanol-1 and 33% of the nonionic surfactant iso-octylphenoxy polyethoxy ethanol having an average of 9–10 ethylene oxide units per mol of alkylated phenol. The resulting tinted latex was mixed in the manner of Example 1 with 1761.5 grams of a pigment base unit like that of Example 1 and 2465 grams of water to give a gallon of an excellent blue aqueous latex emulsion paint. It performed essentially like the paint of Example 1 except that it was slightly less scrubbable.

I claim:

1. An improved paint pigment for blending with aqueous compounded film-forming latex and water to form an aqueous latex paint, said pigment consisting essentially of mineral pigmentary material and 0.1–5 weight percent of finely-divided, water soluble hydroxy ethyl cellulose, said hydroxy ethyl cellulose having level-out time between about 20 seconds and about 30 minutes and viscosity of 200–25,000 centipoises, the viscosity being measured at 20° C. in 2% aqueous solution.

2. The pigment of claim 1 wherein there is 0.8–2% of said hydroxy ethyl cellulose, and it has viscosity between 3500 and 6500 centipoises and level-out time between 1 and about 15 minutes, the viscosity being measured at 20° C. in 2% aqueous solution.

3. The pigment of claim 1 wherein the hydroxy ethyl cellulose is milled with the mineral pigmentary material and has average particle size not substantially above about 150 microns.

4. The pigment of claim 1 wherein the mineral pigmentary material comprises a pigmentary white opacifying agent and kaolinite clay of average particle size between 6 and about 12 microns, the preponderance of individual particles of said clay being not substantially larger than about 50 microns, and the major portion of said clay particles being characteristically in the form of stacks of plate-like structures.

5. The pigment of claim 4 wherein the white opacifying agent is a titania.

6. The pigment of claim 1 wherein there is about 0.05–2% of a pesticide, which pesticide has pH in saturated aqueous solution not substantially above 9.

7. The pigment of claim 6 wherein said pesticide is a phenolic substance possessing fungicidal and germicidal properties.

8. The pigment of claim 7 wherein said pesticide comprises at least one phenolic substance selected from the group consisting of a phenylphenol, a halogenated phenylphenol, and a polyhalogenated phenol.

9. In a process for making aqueous latex paint from water-insoluble mineral pigmentary material, water dispersible bodying agent, and aqueous compounded latex, the improvement which consists essentially of employing as the embodying agent 0.1–5 weight percent, based on the weight of the pigmentary material, of finely-divided, water soluble hydroxy ethyl cellulose having level-out time between about 20 seconds and about 30 minutes and viscosity of 200–25,000 centipoises, the viscosity being measured at 20° C. in 2% aqueous solution.

10. The improvement in process of claim 9 wherein there is incorporated into the pigmentary material about 0.05–2% of a pesticide, which pesticide has pH in saturated aqueous solution not substantially above 9.

References Cited in the file of this patent

UNITED STATES PATENTS 2,502,783     Erickson _____ Apr. 4, 1950

FOREIGN PATENTS 583,204     Canada _____ Sept. 15, 1959